United States Patent
Bhatnagar et al.

(10) Patent No.: US 7,493,325 B1
(45) Date of Patent: Feb. 17, 2009

(54) METHOD FOR MATCHING USER DESCRIPTIONS OF TECHNICAL PROBLEM MANIFESTATIONS WITH SYSTEM-LEVEL PROBLEM DESCRIPTIONS

(75) Inventors: Radhika Bhatnagar, Cary, NC (US); Barnaby L. Court, Morrisville, NC (US); Michael P. Etgen, Cary, NC (US); Anjan Reddy Kundavaram, Durham, NC (US); Elizabeth A. Schreiber, Cary, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,829

(22) Filed: May 15, 2008

(51) Int. Cl.
G06F 17/30 (2006.01)

(52) U.S. Cl. .................. 707/6; 707/1; 707/3; 707/4; 707/7; 707/102

(58) Field of Classification Search .............. 707/1–7, 707/100–102; 705/1
See application file for complete search history.

(56) References Cited

U.S. PATENT DOCUMENTS

| 5,983,364 | A  | * | 11/1999 | Bortcosh et al. ............. 714/25 |
|---|---|---|---|---|
| 6,006,225 | A  |   | 12/1999 | Bowman et al. |
| 6,311,179 | B1 |   | 10/2001 | Agarwal et al. |
| 6,377,965 | B1 |   | 4/2002  | Hachamovitch et al. |
| 6,681,344 | B1 | * | 1/2004  | Andrew ..................... 714/38 |
| 6,763,517 | B2 | * | 7/2004  | Hines ........................ 717/124 |
| 6,859,893 | B2 | * | 2/2005  | Hines ........................ 714/38 |
| 7,133,866 | B2 |   | 11/2006 | Rishel |
| 2003/0177417 | A1 |  | 9/2003  | Malhotra |
| 2004/0260595 | A1 |  | 12/2004 | Chessell et al. |
| 2006/0123338 | A1 | * | 6/2006  | McCaffrey et al. ......... 715/531 |
| 2007/0192085 | A1 |  | 8/2007  | Roulland et al. |
| 2007/0283338 | A1 |  | 12/2007 | Gupta |
| 2007/0296615 | A1 |  | 12/2007 | Raguseo |
| 2008/0091454 | A1 | * | 4/2008  | Fisher, Jr. ..................... 705/1 |

OTHER PUBLICATIONS

Topol et al. "Automating Problem Determination: A First Step Toward Self-Healing Computer Systems", IBM Autonomic Computing, Oct. 2003.

Church, Kenneth "Word Association Norms, Mutual Information and Lexicography" Computational Linguistics, vol. 16, No. 1, Mar. 1990.

* cited by examiner

*Primary Examiner*—Debbie M Le
(74) *Attorney, Agent, or Firm*—King & Spalding LLP

(57) ABSTRACT

A computer implemented method of matching user descriptions of technical problem manifestations with system problem descriptions in which system-level symptoms for computer-related problems which map to problem descriptions and recommended fixes are broken into sub-phrases, and an index of association ratios between the system-level symptom sub-phrases and sub-phrases derived from text extracted from corpora related to computer problem symptoms is generated and prioritized. When user-entered text related to a computer-related problem is received, it is searched against the prioritized index, and matches are presented for the user in order of prioritization from which the user can select and run a recommended fix to which the selection is mapped.

1 Claim, 4 Drawing Sheets

METHOD FOR MATCHING USER DESCRIPTIONS OF TECHNICAL PROBLEM MANIFESTATIONS WITH SYSTEM-LEVEL PROBLEM DESCRIPTIONS

BACKGROUND OF THE INVENTION

1. Field of the Invention

This invention relates to matching user descriptions of technical problem manifestations with system level descriptions.

2. Description of Background

Currently, many small businesses are managing their information technology (IT) infrastructure without the aid of a dedicated IT staff with detailed knowledge of their software and hardware solutions. "IT-responsible" people are people who are primarily business application users who also perform IT tasks only as a secondary part of their jobs. Such people view application software stacks as a single solution rather than as component parts. They expect these solutions to be capable of being managed and analyzed as a single entity. Often, solutions consist of a number of distinct products and dozens of logs located throughout the system. Existing technology does not fully meet the needs of the type of relatively low skilled IT user typically found in this market. One area where this is especially true is in helping IT-responsible users troubleshoot application problems experienced by other business users in the company.

IT-responsible persons in small businesses are the "go-to" people when another business user has any sort of technical problem. The types of issues which business users have can vary significantly from basic application usage to complete system failure, and an IT-responsible person must attempt to deal with all of those types of issues. Today, most IT-responsible persons use artifacts such as POST-IT™ Notes or MS WORD™ documents to store troubleshooting knowledge which they acquire through experience over time. Other common sources of troubleshooting knowledge referenced by IT-responsible persons are sites such as GOOGLE™, YAHOO™, or product vendor support sites.

However, there are major issues with respect to the current situation for small businesses. For an example of such an issue, an IT-responsible person must try to use a business user's verbal description of the business user's problem as the basis for researching how to solve the problem. Because IT-responsible persons typically lack in-depth knowledge of the complete software/hardware solution, it is extremely difficult for them to understand how problems down in the software/hardware stack may be manifested in the behavior of the business applications used in the office.

Another such issue arises in the chain of communication as problems and user or system actions are summarized verbally or textually and passed between people. Much like the old parlor game in which someone whispers a sentence into your ear and you pass it around the room to see how much it has changed by the time it gets back to the person who started the game, as information is transferred and restated between parties, meanings and phrases can be lost or distorted after only a single transfer of information.

There are presently a number of different software-based trouble ticketing or service request applications on the market. However, the level of formality around the process of such applications, such as requiring the user to open a trouble ticket, put it in a queue, check out the trouble ticket, etc., rarely, if ever, serves to increase the effectiveness of an IT-responsible person in performing the troubleshooting task. Rather, the IT-responsible person needs intelligent assistance from the software/hardware solution stack in understanding how the business user's problem does or does not relate to the componentry of the overall solution. For example, the IT-responsible person needs to understand if it is only a simple user error, such as typing a password with the capslock on, or if it is something more insidious on the server side, such as the LDAP server being down. The use of intelligent analysis of business user problem descriptions can provide IT-responsible persons with a powerful tool for helping to efficiently and effectively deal with IT tasks, which are the most common but least product-supported tasks for a typical business.

SUMMARY OF THE INVENTION

Embodiments of the present invention deal with finding associations between common language phrases and domain-specific knowledge instead of generating associations in a database based on finding associations between the items populated in the database. Further, embodiments of the invention assume that a database of technical language symptoms and their related solutions already exists and is part of a known troubleshooting process instead of proposing the creation of such a database.

An application for embodiments of the invention employs an algorithm for breaking sentences and phrases into sub-phrases while at the same time offering significant improvement over previously available applications in a number of ways. For example, embodiments of the invention use translated source phrases from various national languages so that user-entered descriptions can be matched in the user's natural language.

Additionally, embodiments of the invention perform matches based on associations that are derived from domain-specific knowledge instead of simple matching based on the existence of the user-entered word or phrase in the symptom. Additionally, embodiments of the invention utilize a ranking algorithm that is based on association ratio and fidelity of the matched phrase as opposed to matching based on words and phrases that are normalized by grammar rules.

Embodiments of the invention propose a computer implemented method of matching user descriptions of technical problem manifestations with system problem descriptions in which one or more system-level symptoms for each of a plurality of computer-related problems which map to a corresponding problem description and a recommended fix for each computer-related problem are received from a symptom database and broken into system-level symptom sub-phrases based on a pre-selected breakdown methodology.

Thereafter, a list of association ratios between symptom sub-phrases derived from text extracted from corpora related to computer problem symptoms and the system-level symptom sub-phrases is generated based upon a pre-selected association methodology, each of which derived sub-phrases is linked back to the corresponding problem description, and an index of prioritized association ratios between the derived symptom sub-phrases and the system-level symptom sub-phrases is generated based on a pre-selected ranking methodology.

When user-entered text related to a symptom of a computer-related problem is received, the user-entered text is searched against the prioritized index of symptom associations, and a list of textual matches between the user-entered text and the derived and system-level symptom sub-phrases in order of prioritization is presented to the user. The user can select a derived or system-level symptom sub-phrase from the list and run the recommended fix to which the selected symptom sub-phrase is mapped. If the computer-related problem is fixed by running the recommended fix, the user-entered text is added to the index of prioritized symptom associations database, but if the computer-related problem is not fixed, the user is prompted to make another selection from the list.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for implementing a method of matching user descriptions of technical problem manifestations with system problem descriptions in which system-level symptoms for computer-related problems which map to problem descriptions and recommended fixes are broken into sub-phrases, and an index of association ratios between the system-level symptom sub-phrases and sub-phrases derived from text extracted from corpora related to computer problem symptoms is generated and prioritized. When user-entered text related to a computer-related problem is received, it is searched against the prioritized index, and matches are presented for the user in order of prioritization from which the user can select and run a recommended fix to which the selection is mapped.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
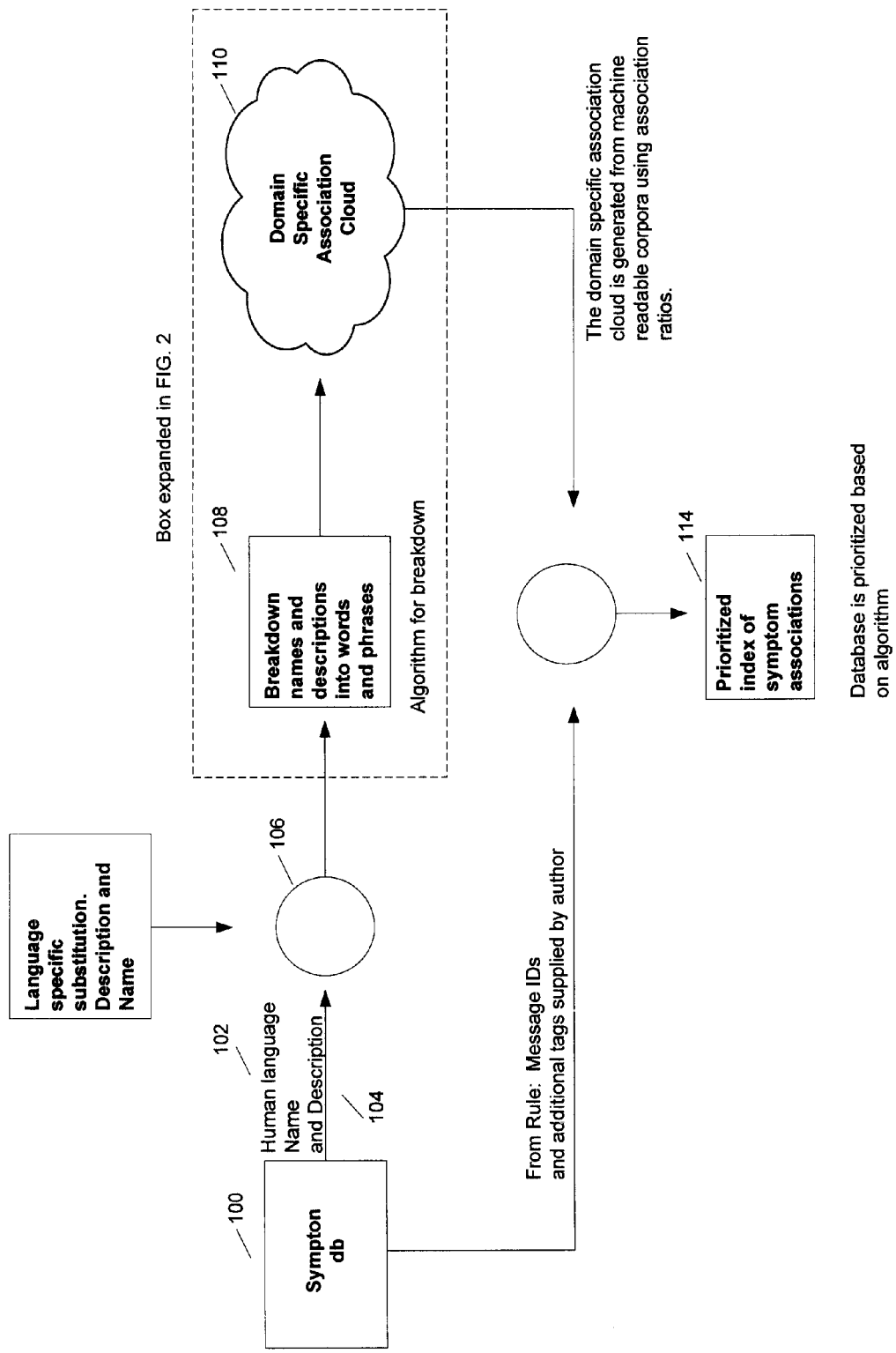
FIG. 1 is a flow chart that illustrates an overview example of preprocessing for embodiments of the invention.

In embodiments of the invention, when a symptom database is loaded by the system, a set of "preprocessing" steps occurs as follows. First, the original system-level textual content is read from the symptom database and captured as meaningful sub-phrases (e.g., typically short phrases such as "the computer is frozen" or "the server is crashed").

The translated sub-phrases are then sent to a language-specific Domain Association Network (DAN) service which can be created based upon a computer-mediated generation of domain association ratios (i.e., word association norms estimated directly from computer readable corpora) or based upon human-generated associations which calculates an association ratio between the original sub-phrases and other associated sub-phrases. The source for the DAN service can be domain-specific wikis, blogs, support papers and forums, product documentation, etc.

Thereafter, the DAN service returns a complete set of associations for the text from each symptom, which set of associations is used to populate a Prioritized Index of Symptom Associations (PISA) database. The PISA database contains associations indexed to symptoms in the symptom database.

The term "domain-specific" as used herein refers, for example, to verbiage and word phrases that are specific to a particular field, such as the software field, although not necessarily limited to that field. Typically, especially with the software industry, there is a substantial amount of documentation and help and on-line material that is written in a vocabulary that an average person may not understand. For example, the average person may understand the term "computer monitor" because he or she has a computer at home. They also know what a keyboard and a PC are, but they may not understand more technical terms such as "server" or "back-end software program" or "database".

A problem arises in deploying ever more advanced systems to customers who are ordinary non-technical people. While such systems normally work quite well, when something goes wrong, it is desirable to provide these customers with self-help that enables them to identify and resolve the problem themselves. Assume, for example, that a software system deployed at a dentist's office is not working and that the bookkeeper needs to get his or her payroll application back up. An aspect of embodiments of the invention provides a self-help program that allows the bookkeeper to type in phrases such as, "I can't do payroll" or "I can't write checks" and matches those phrases to the domain-specific terms which may exist in the software help documentation.

Thus, if the bookkeeper types in the phrase "I can't access payroll", the self-help program for embodiments of the invention may match that phrase with something more technical such as "The payroll database is not responding" which is a technical phrase representing the nature of the problem. In this way, embodiments of the invention simplify the overall trouble-shooting process and enable customers who are non-technical people to use common every-day language phrases and be directed to the appropriate place in the software or to the appropriate documentation for help in resolving the problem.

This aspect of embodiments of the invention builds on an artifact referred to as a "symptom database". The components of a symptom database are a description of the problem, the symptoms of the problem which map to the description, and a recommendation for ways to fix the problem. Using the analogy of medical conditions, symptoms in the database may be, for example, an elevated body temperature, fatigue and perspiring, and the corresponding condition or description of the problem in the symptom database may be a cold, for which the recommended corrective action in the database may be to take aspirin and decongestants and rest.

FIG. 1 is a flow chart that illustrates an overview example of preprocessing for embodiments of the invention. Referring to FIG. 1, the symptom database 100 is an artifact that contains entries used for existing problem determination processes. Entries in the symptom database 100 contain embedded programmatic elements and human consumable elements. The human consumable elements are a 'Name' field 102 and a 'Description' field 104. The 'Name' 102 is a short description of the observable impact which the problem is having on a target system. The 'Description' 104 is a longer detailed subscription that provides additional information about the observable impact and the specific technical problems on a target system. The symptom database entries 100 also contain keywords and tags added by the author that represent terms commonly associated with the problem.

The 'Name' 102 and 'Description' 104 fields along with author-generated keywords and tags for each entry in the database 100 are translated at 106 for each supported national language. Referring to FIG. 1, assuming an English language symptom database 100, human language specific substitutions for symptom names and descriptions are brought in at 106 for accessibility in multiple languages in order to support other languages, such as Spanish and French. In other words, Spanish or French phrases can be substituted for the corresponding English phrases, so a Spanish or French speaker can type in symptoms in their native language.

For each translated result, an algorithm is applied at 108 to create a new result set that can be sent to the language-specific Domain Association Memetic Network service 110. The algorithm to create the new result set at 108 is applied as follows:

Single words are sent directly to the result set.
Phrases that are two or more words are broken into multiple results as follows:
Punctuation is removed. Adjacent words are used to create sub-phrases. The sub-phrases combination will be the summation of the length of the phrase. For example:
Phrase: The server stopped responding.
Result set: The server stopped responding
server stopped responding
stopped responding
responding
The server stopped
server stopped
stopped
The server
server
The
Duplicate results in the result set are removed.

Figure 2:
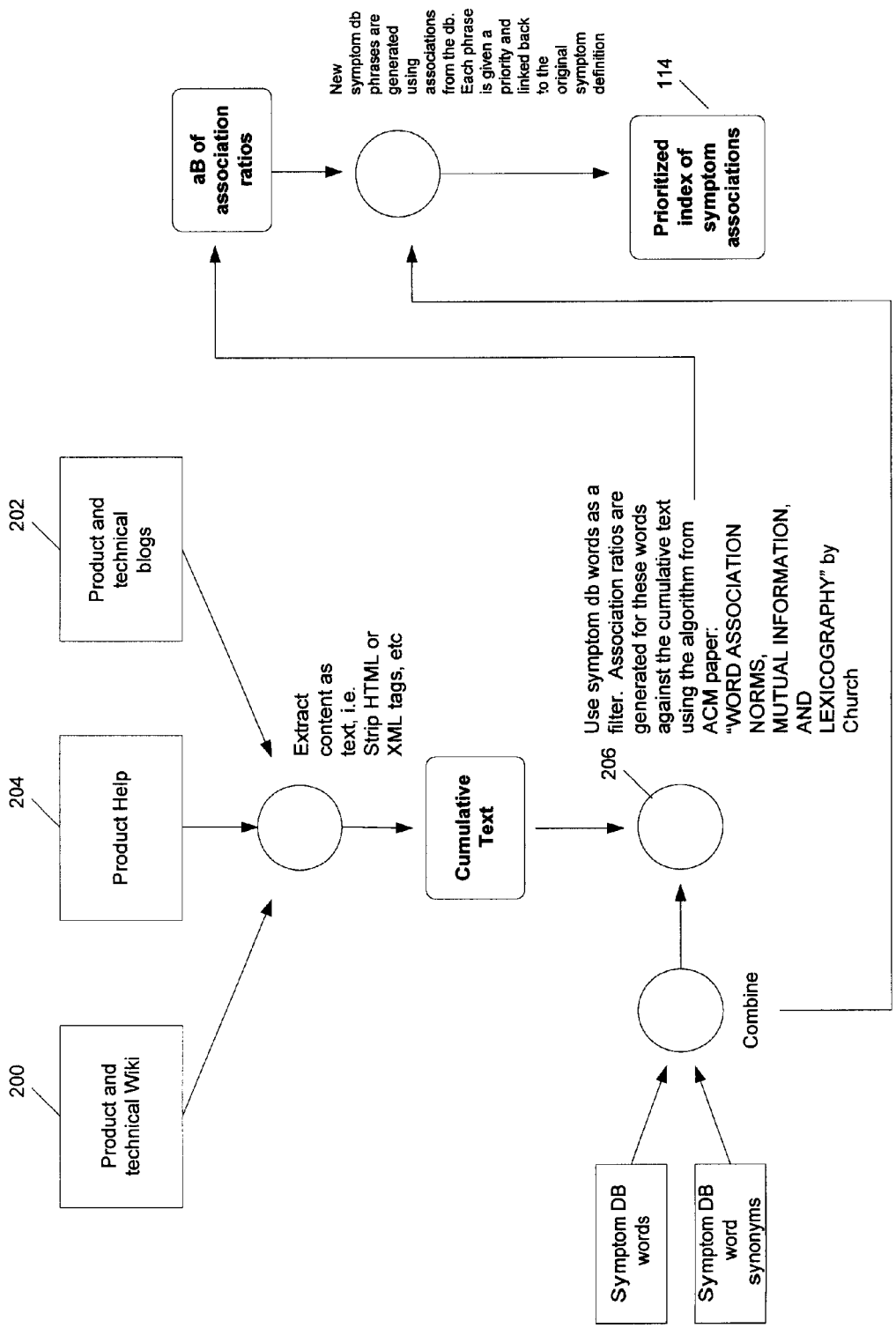
FIG. 2 is a flow chart that illustrates an example of the DAN service preprocessing for embodiments of the invention.

The translated sub-phrases are then sent to the language-specific Domain Association Memetic Network for IT (DAN) service 110. FIG. 2 is a flow chart that illustrates an example of the DAN service 110 preprocessing for embodiments of the invention. The DAN service 110 service can be created based upon a computer-mediated generation of domain association ratios as described, for example, in an Association for Computing Machinery (ACM) paper at http://portal.acm.org/citation.cfm?id=981633. The body of knowledge used to generate the Domain-Specific Association Cloud 110 can be any machine readable corpora (i.e., multiple collections of texts) such as wikis 200, blogs 202, support papers 204, forums, product documentation, etc.). The Domain-Specific Association Cloud 110 can also be based upon human-generated associations such as those found at www.braincloud.com.

Embodiments of the invention involve prioritizing the symptom database 100 based on how well phrases offered in common everyday language match actual symptoms in the symptom database 100. For example, in the medical condition analogy, the common language phrase "I'm sweating and tired" may have a very high priority because it matches closely to the symptoms for a cold in the symptom database. On the other hand, the common language phrase "I'm feeling hot and weak" may have a lower priority because, while it could mean the same thing, it matches less closely to the symptoms for a cold in the symptom database 100.

In building domain-specific associations, the word "server" should match, for example, "computer" or "workstation". In order to do that without thinking up all possible substitutes and manually entering them, embodiments of the invention utilize an algorithm such as proposed by Church in the foregoing ACM paper for determining associations between words and phrases. Embodiments of the invention apply the algorithm to look at known domain-specific words or phrases such as found in product and technical wikis 200, product and technical blogs 202, and the like written by various people in the context of computer programs and software engineering, and product help 204 typically authored by technical people in the computer industry.

When people write these things, especially in wikis 200 and blogs 202, they naturally make associations between words and phrases in a way that is similar to the way they normally speak to each other. In other words, they may not always use the proper technical words, such as "workstation" or "server". Instead, a user may write something such as "My computer with DB2 (database 2) stopped working", and someone in help support may come in and tell him or her how to fix it.

The algorithm is applied in the domain-specific field to generate a list of associations for a database that relates, for example, "computer" to "workstation" to "laptop" as well as to other synonyms and to particular problems they may have. The algorithm generates the list and also has a process for determining how close a match each association is. Among other things, the algorithm utilizes parameters, such as how physically close together particular words or phrases were used, and if they are in the same document, how many times each word or phrase appears, and the like.

The service 110 calculates an association ratio between the original sub-phrase and the derived sub-phrases at 206, and the derived sub-phrases and association ratios from this step and the original sub-phrases are sent to a prioritized index of symptom associations database 114. The problem specific message IDs taken from the symptom database 100 are sent directly to the prioritized index of symptom associations database 114 with a very high association ratio.

The association ratio between the original sub-phrase and the derived sub-phrases and the problem specific message IDs taken from the symptom database 100 are prioritized as follows:

The author supplied keywords, tags and message IDs and original phrases (for all languages) are given the highest priority.
The following process is applied to each phrase to generate an priority in the PISA database:
The phrase is parsed into words.
One word is substituted with an associated word from the DB of association ratios.
The priority of the new phrase is the priority of the original phrase * the association ratio.
The new phrase is added into the PISA and points to the original symptom definition.
This process is repeated for each word in the source phrase and each available association ratio for individual words. Duplicates are removed.

The resultant database is called the Prioritized Index of Symptom Associations (PISA) 114, which maps words and phrases back to the original symptom definitions in the source symptom database 100.

Embodiments of the invention employ a symptom database of technical symptom words, and an optional symptom database of technical symptom synonyms which can be manually entered, such as "workstation", "server" and the like, which are used to filter text from wikis 200, blogs 202, and product help 204. The algorithm is applied to the cumulative text extracted from the product and technical wikis 200, product and technical blogs 202, and product help 204 to find associations only for words and phrases which correspond to relevant symptoms. A list of associations, each with a ranking and each linked back to a corresponding original symptom (i.e., a prioritized list of words and phrases referred to herein as a PISA matching back to the symptoms) is generated.

Thus, embodiments of the invention prioritize common everyday phrases based on how well they match actual symptoms of computer related problems. When the user types in the symptoms he or she may be experiencing with a computer system in common everyday terms, the user is presented with a list of matches based on text and association priorities. The user can then read over the list and perhaps identify something similar to what he or she is experiencing and enter a selection to run the corresponding corrective action.

When a user interacts with the system for embodiments of the invention, "task-processing" occurs. For example, when the user begins to type the symptoms, word and phrase substitutions are used to make suggestions that avoid requiring the user to type out an entire description of the symptoms. For example, a layperson may type in the word "server", which in the correct technical domain-specific language may actually refer to "computer" or "workstation". They are both perfectly valid substitutes for the word "server" in the general context of computer systems, but that may not be true in a different context, such as a server in a restaurant.

The user may select one of the preview text entries, or finish entering a string and click on 'submit'. The system for embodiments of the invention takes the input string and runs a typical search algorithm against the PISA database contents. A list of symptom definitions are then returned in prioritized order of "best matches" (i.e., calculated as closest textual match and PISA database priority).

The user reviews the symptom matches, determines whether any of them seem to be the problem being experienced, and selects, and is presented with, a guided set of steps to address the problem. If that fixes the user's problem (i.e., the user successfully completes the actions and closes the problem), then the exact string entered by the user is used to either create a new high priority association for this symptom in the PISA database (if not an existing string in the PISA database), or increase the priority of an existing string in the PISA database. On the other hand, if the symptom chosen by the user does not fix the problem, the user can return to the list of symptom matches to select a different one.

Figure 3:
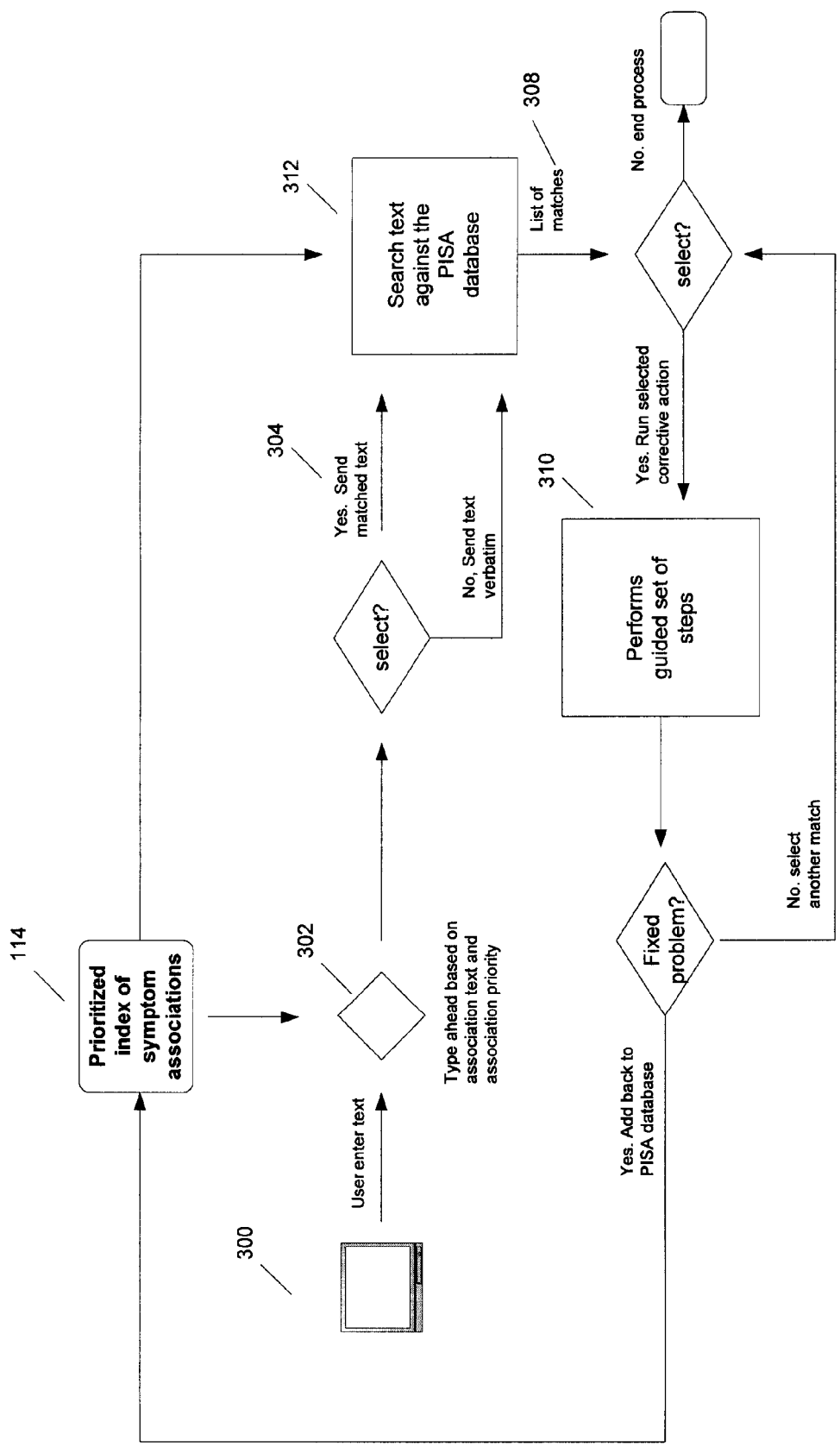
FIG. 3 is a flow chart that illustrates an example of task processing that occurs when a user interacts with the system for embodiments of the invention.

FIG. 3 is a flow chart that illustrates an example of task processing that occurs when a user interacts with the system for embodiments of the invention. Referring to FIG. 3, the user begins typing a string into the input field for a user-reported problem at 300, and the system begins doing "preview/look-ahead" input completion at 302 which works by way of a string matching procedure and orders those matches based upon string match and PISA database priority 312. These are "known phrases" that will be used to suggest specific textual descriptions of problems.

Figure 4:
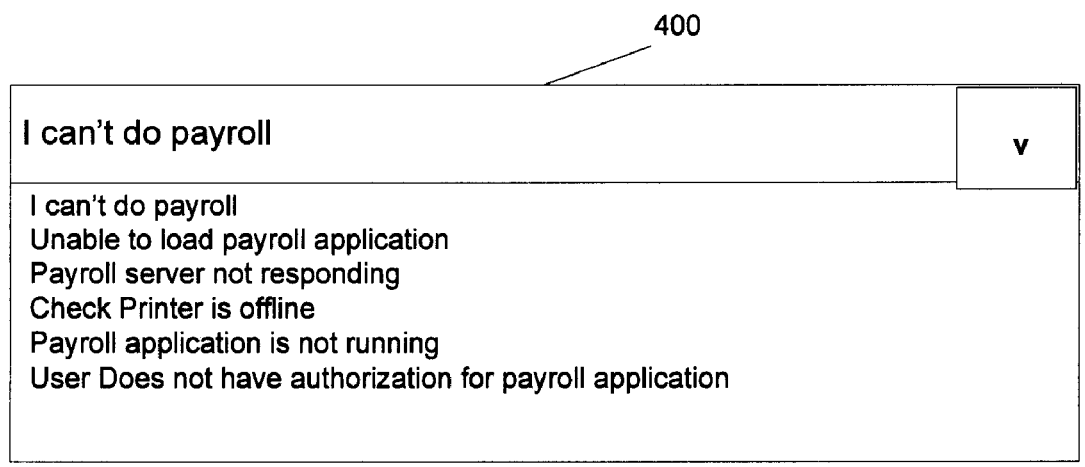
FIG. 4 is a sample user interface that illustrates a preview text entry selection list for embodiments of the invention.

FIG. 4 is a sample user interface 400 that illustrates a preview text entry selection list for embodiments of the invention. The user may select one of the preview text entries at 304 or finish entering a string and click on 'submit' at 306. The system takes the input string and runs a typical search algorithm against the PISA database contents 114. A list of symptom definitions are then returned at 308 in prioritized order of "best matches" (i.e., calculated as closest textual match and PISA database priority). The user can peruse the list from highest to lowest priority, and if he or she recognizes something that corresponds to the problem that he or she is experiencing, the user can enter a selection and run the recommended corrective action.

The user reviews the symptom matches and determines whether any of them seem to be the problem being experienced and at 310, the user selects, and is presented with a guided set of steps to address the problem. If that fixes the problem (i.e., the user successfully completes the actions and closes the problem), the successful resolution to the problem is used as feedback to adjust the priorities of entries in the PISA 114 using the following process:

The exact string she entered is used as the source phrase.

If the source phrase does not exist in the PISA 114, then a new entry with a high priority is created.

If the source phrase does exist in the PISA 114 then the priority of the entry is increased by 20%.

Thus, if running the recommended action fixes the problem, then the description and corrective action is fed back into the PISA database 114, and if other users have similar experiences, the association may eventually be adjusted upwardly. If the symptom chosen by the user did not fix the problem, the user can return to the list of symptom matches to select a different one.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method of matching user descriptions of technical problem manifestations with system problem descriptions, comprising:

a. receiving from a symptom database at least one system-level symptom for each of a plurality of computer-related problems which maps to a corresponding problem description and a recommended fix for said one of said computer-related problems;

b. breaking each of the system-level symptoms into system-level symptom sub-phrases based on a pre-selected breakdown methodology;

c. generating a list of association ratios between symptom sub-phrases derived from text extracted from corpora related to computer problem symptoms and the system-level symptom sub-phrases based upon a pre-selected association methodology, each of which derived sub-phrases is linked back to the corresponding problem description, said association ratios being based on a degree of closeness of matching relationship between the symptom sub-phrases derived from text extracted from corpora related to computer problem symptoms and the system-level symptom sub-phrases;

d. generating in a prioritized index of symptom association (PISA) database an index of prioritized association ratios between the derived symptom sub-phrases and the system-level symptom sub-phrases based on a pre-selected ranking methodology, said index of prioritized association ratios representing an arrangement of the association ratios in order of the degrees of closeness of matching relationships between respective symptom sub-phrases derived from text extracted from corpora related to computer problem symptoms and the system-level symptom sub-phrases;

e. receiving user-entered text related to a symptom of a computer-related problem;

f. searching the user-entered text against the prioritized index of symptom associations;

g. presenting a list of textual matches between the user-entered text and the derived and system-level symptom sub-phrases in order of prioritization;

h. receiving a user's selection of a derived or system-level symptom sub-phrase from the list and running the recommended fix to which the selected symptom sub-phrase is mapped;

i. if the computer-related problem is fixed by running the recommended fix, adding the user-entered text to the index of prioritized symptom associations of the PISA database with a corresponding association ratio based on a matching relationship between the user-entered text and the selected system-level symptom sub-phrase; and j. if the computer-related problem is not fixed by running the recommended fix, prompting the user to enter another selection of a derived or system-level symptom sub-phrase from the list.

* * * * *